June 12, 1934.   A. L. CASH   1,962,857
FLUID OPERATED CONTROL SYSTEM FOR VEHICLES
Filed Sept. 19, 1932
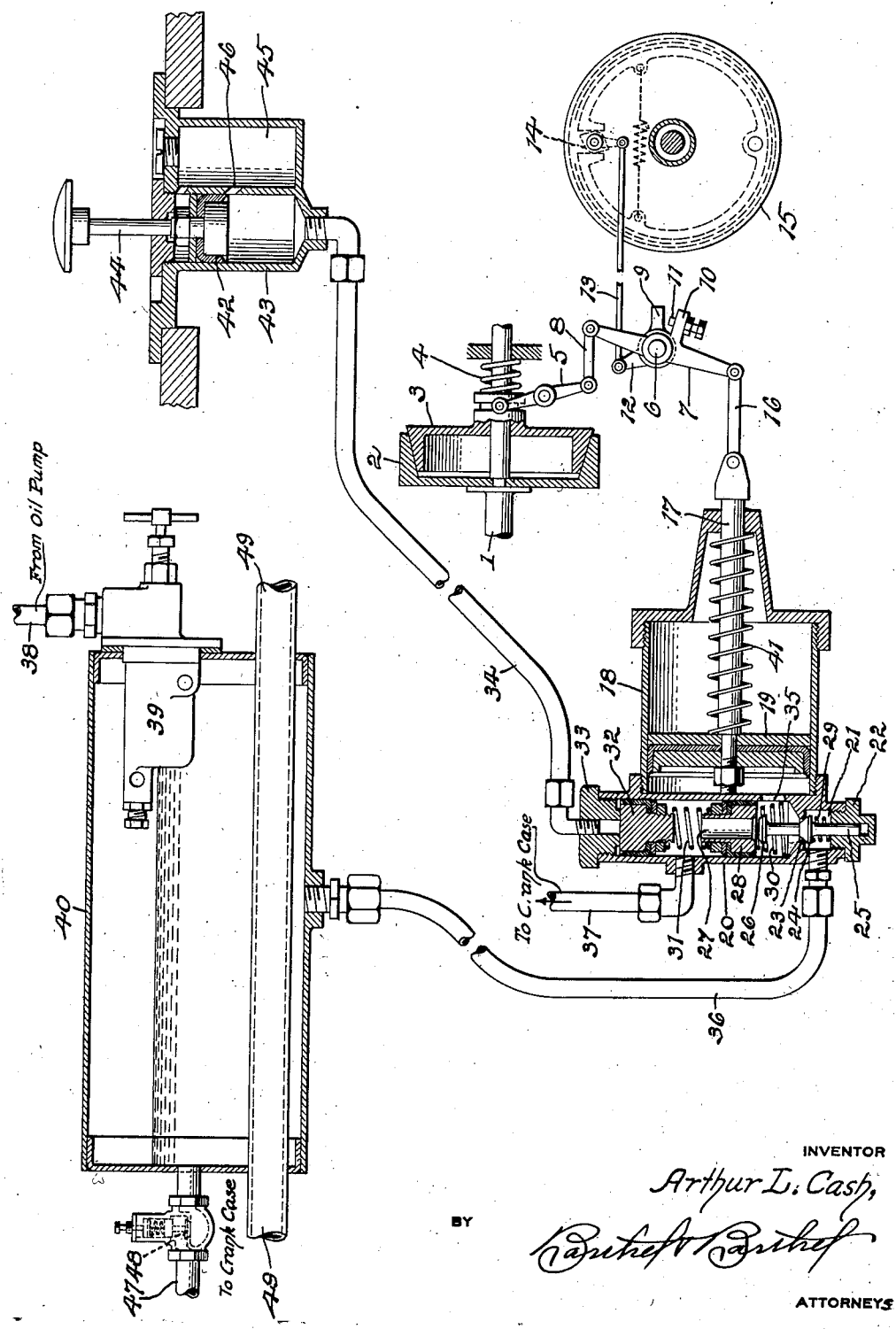
INVENTOR
Arthur L. Cash,
BY
ATTORNEYS Patented June 12, 1934

1,962,857

UNITED STATES PATENT OFFICE 1,962,857

FLUID OPERATED CONTROL SYSTEM FOR VEHICLES

Arthur L. Cash, Marine City, Mich., assignor of one-half to Peter A. Markey, Detroit, Mich.

Application September 19, 1932, Serial No. 633,701

3 Claims. (Cl. 192—13)

This invention relates to a fluid operated control system for motor vehicles and more particularly to fluid operated means for operating the clutch and brakes of a motor vehicle, the arrangement being such that when the brakes are set, the clutch is simultaneously thrown out, such control being effected through the medium of a single manually operated member for forcing oil or other fluid to a double control valve for controlling the flow of oil or other fluid under pressure, from a suitable source, to operate the clutch and brakes.

An object of the arrangement embodying the present invention, is to simplify the system and minimize the number of parts, thus lessening the liability of the system to get out of order, and reducing cost of manufacture and installation. It is also an object to provide such a system with means for keeping the oil in the system in proper fluid state and free from impurities, and to provide certain other new and useful features, all as hereinafter set forth and more particularly pointed out in the appended claims, reference being had to the accompanying drawing in which the system is illustrated diagrammatically and the several elements embodied in the system are shown in section.

In the drawing, 1 is illustrative of the usual engine drive shaft of a motor vehicle, to which shaft the usual clutch cup 2 is secured to be engaged in the usual manner by the clutch cone 3 which is urged toward the cup by a spring 4 and moved in an opposite direction against the action of said spring 4, by means of a pivoted yoke 5, all as commonly constructed and arranged in motor vehicle constructions, this showing being merely illustrative of one form of clutch, it being understood that any suitable clutch mechanism may be employed.

Pivotally supported intermediate its ends in any suitable manner, as upon a fixed pivot 6, is an operating lever 7, the upper end of the upper arm of which is operatively connected with the lower end of the yoke 5 by a link 8, and upon the same pivot or shaft 6 is a bell crank lever, the lower arm 9 of which is in opposed relation to a lug 10 on the lever 7, which lug carries a set or adjustable stop screw 11 to engage the arm 9 and turn the same when said lever 7 is swung. The upper arm 12 of said bell crank is connected by a rod 13 with any suitable brake operating mechanism indicated at 14 within the usual brake drum 15, which drum or drums are usually mounted upon the supporting ground wheels of the vehicle.

To swing the lever 7 and thus simultaneously throw out the clutch and set the brakes, or vice versa, the lower end of said lever 7 is connected by a link 16, with the rear end of a piston rod 17 which projects through the rear end of a cylinder 18, said rod having a piston 19 secured upon its inner end. Secured to or formed integral with the forward or head end of said cylinder, is a transversely extending tubular valve casing 20, the lower end portion of which is formed with a chamber 21, closed at its outer end by a screw plug 22 and the inner end of which chamber is formed by a transverse dividing wall having an axial opening 23 affording communication between this end chamber and the interior of the body of the casing, said opening forming a seat for an upwardly seating valve 24 which is formed integral with a stem 25 guided at its lower end within a bore in the plug 22, and extended at its upper end, upwardly from the valve 24 through the opening 23 into the main chamber of the casing for a short distance where it is formed upon its upper end with a valve 26 adapted to seat within the lower end of an axial passage 27 extending through a piston 28 slidable within said casing chamber which forms a cylinder therefor. A spring 29 sleeved on the stem 25 within the chamber 21 exerts a force tending to hold the valve stem in up position with said valve 24 seated and the valve 26 in raised position. A similar spring 30 in the casing below the piston 28 exerts a force to hold said piston raised against the action of a third spring 31 seated at its lower end upon the upper end of said piston 28 and at its upper end, upon the lower end of a second piston 32, said piston 32 being thus normally held raised with its upper end abutting a plug cap 33 in the upper end of the casing, said cap having an axial opening into which is screwed one end of a control line pipe 34 through which fluid or oil may be forced into the valve casing 20 above the piston 32 to move said piston downward and through the pressure of said piston upon the spring 31, move the piston 28 against the action of the spring 30 until said piston 28 engages the valve 26, thereby closing the passage through said piston, when, upon further downward movement of said piston 28, the valve stem 25 will be moved downward, opening communication between the lower end of the cylinder 20 and the chamber 21 past the valve 24.

The wall of the cylinder or casing 20 just above the valve seat 23, is formed with an opening 35 which affords free communication between said casing below the piston 28 therein and the end of the cylinder 18, and opening into the chamber 21 below the valve 24, is an oil supply pipe 36 for conducting oil under pressure from a suitable source into said chamber 21, and leading from one side of the casing 20 between the pistons 28 and 32 therein, is an oil outlet or return pipe 37 which leads to the crank case of the vehicle engine (not shown) or other sump from which the oil is drawn by means of a suitable engine driven oil pump (not shown) and delivered under pressure by said pump through a pipe 38 to an oil filter 39 of any suitable construction, from which filter it flows into a suitable oil pressure tank 40, to the bottom of which tank the pipe 36 is connected for delivering this oil under pressure into the chamber 21 at the lower end of the casing 20, from which chamber it will flow into the lower end of the casing below the piston 28, when the valve 24 is opened by the downward movement of said piston which seats it upon the valve 26 which valve thus closes the passage 27, so that the full pressure of oil will enter the cylinder 18 through the opening 35 behind the piston 19 and drive this piston toward the opposite end of the cylinder against the action of a spring 41 sleeved upon the piston rod.

Oil is supplied under pressure to the pipe 34, by means of a piston 42 within a cylinder 43, said piston having a stem 44 provided with a head and said cylinder being located on the vehicle in a position to bring this stem in a position where it may be conveniently operated by the driver of the car.

The proper amount of oil is maintained in the cylinder 43 by providing an auxiliary supply chamber 45 alongside said cylinder in communication therewith through an opening 46 so located that when said piston 42 is at the upper end of its stroke, it will uncover said opening and permit oil to flow into said cylinder from said chamber if the level in the cylinder is below that of the oil in said chamber when the piston comes to the upper end of its stroke, said chamber having a removable fill plug in its upper end so that the oil may be replenished when needed.

The driver of the vehicle, by pressing upon the stem 44, forces the piston 42 down in its cylinder, thus compressing the oil therein and forcing it out through the pipe 34 into the upper end of the casing 20 against the end of the piston 32 therein. This will in turn, through the action of the spring 31, force the piston 28 downward, and continued pressure will bring said piston 28 into contact with the upper end of the stem 25, seating the valve 26 and closing the passage 27 through said piston, when further pressure will unseat the valve 24 and permit the oil under pressure from the tank 40 to flow from the chamber 21 past said valve and out through the opening 35 into the cylinder 18, forcing the piston 19 toward the rear end thereof against the action of the spring 41 and operating the clutch and brakes if moved to the limit of its movement, or if moved only part way, operating to throw out the clutch only, as the first part of the movement of the lever 7 is independent of the lever arm 9 due to the space between the stop 11 and said arm, and this relative movement between the clutch operating and the brake operating levers may be adjusted as desired by adjusting said stop screw 11.

As soon as the driver lets up on the piston 42, pressure in the line 34 is relieved and also pressure on the piston 32, and through the spring 31, also relieving pressure on the piston 28, thus permitting said piston to rise and the stem 25 to rise with it, first bringing the valve 24 to its seat and closing communication between the chamber 21 and the cylinder 20 below the piston 28. This cuts off the oil pressure from the supply tank and further release of pressure upon the piston 28 will permit said piston to leave its seat on the valve 26, thus opening the passage 27 through said piston. As soon as the passage 27 opens, oil which has been trapped under pressure in the cylinder 18 and has moved the piston 19, may flow through this passage and out through the pipe 37, back to the engine crank case, the spring 41 serving to move the piston 19 to the forward end of its stroke, to release the brakes and let the clutch in. With this arrangement the clutch is always released prior to the setting of the brakes, and the relative movement between brake and clutch operating levers, permits of the throwing out of the clutch by a proper application of pressure by means of the piston 42, without applying the brakes, if so desired.

In the arrangement as previously described, oil is forced under pressure into the storage tank 40, by means of a pump (not shown) driven by the engine, and to prevent too great a pressure being created in said tank, this tank is connected to the engine crank case by a return pipe 47 in which is a poppet valve 48 adapted to open at a certain set pressure and permit excess pressure to pass out into the engine crank case.

In very cold weather the oil in the system will become thick and sluggish, and to guard against such a contingency, a pipe 49 is extended through the lower part of the tank 40 and this pipe will be connected up to the water cooling system of the engine to pass hot water therethrough, or connected to the exhaust manifold of the engine so that hot gasses will be passed through this pipe and heat the oil in the tank.

With the present arrangement, the oil used to control the operation of the clutch and brakes, is drawn from the engine crank case and therefore the crank case lubricant, in this system, is circulated constantly and cleansed by being passed through the oil filter 39 which forms part of the system, so that clean, pure oil is maintained in the engine crank case.

Obviously changes may be made in the construction and arrangement of parts of the present control system, without departing from the spirit of the invention, and I do not, therefore, limit myself to the particular construction shown.

Having thus fully described my invention, what I claim is:—

1. The combination with motor vehicle control instrumentalities, of a cylinder, a piston in said cylinder operatively connected to said instrumentalities, a second cylinder in open communication with said first named cylinder and having a chamber, means for supplying fluid under pressure to said chamber, a valve to control communication between said chamber and said second cylinder, a piston in said second cylinder having a passage therethrough, a second valve to close said passage, said valves having a common stem, a fluid return pipe leading from said last named cylinder, a second piston in said last named cylinder, a pipe to conduct fluid under pressure to said last named cylinder to operate said last named piston therein, and manually operable means for forcing fluid into said pipe.

2. The combination with motor vehicle control instrumentalities, of a cylinder, a piston in said cylinder operatively connected to said instrumentalities, a second cylinder in communication with said first named cylinder and formed with a division wall forming a valve seat and a chamber below said seat, means for supplying fluid under pressure to said chamber, a piston in said second cylinder above said valve seat and formed with an axial passage, a valve to seat upon said valve seat and close communication between said chamber and the interior of said second cylinder below said piston therein, said valve having a stem extending toward said piston and formed with a second valve to close said passage in said piston, a fluid outlet pipe opening into said second cylinder above said piston therein, a second piston in the upper end of said second cylinder, a pipe opening into the upper end of said second cylinder above said second piston, and means for forcing fluid into said last named pipe to move said second piston and thereby move said first named piston in said second cylinder to seat upon said valve upon the upper end of said stem and move said stem and valves.

3. The combination with a motor vehicle clutch and brakes, of an operative connection including levers whereby the operation of said clutch is effective in operating said brakes; of a cylinder, a piston in said cylinder operatively connected to certain of said levers to impart motion to said operative connection and operate said clutch and brakes, a tank for storing fluid under pressure, a filter through which fluid under pressure is forced into said tank, a second cylinder communicating with one end of said first named cylinder, a pipe for conducting fluid under pressure from said tank to said second cylinder, a piston in said second cylinder, valvular means in said second cylinder for controlling communication between said pipe and said first named cylinder and for controlling the outlet of fluid from said cylinders, and means for operating said valvular means including a control cylinder connected to said second named cylinder to supply fluid under pressure thereto for operating said piston in said second cylinder, and a manually operable piston in said control cylinder.

ARTHUR L. CASH.